(12) United States Patent
Thundat et al.

(10) Patent No.: US 6,263,736 B1
(45) Date of Patent: Jul. 24, 2001

(54) ELECTROSTATICALLY TUNABLE RESONANCE FREQUENCY BEAM UTILIZING A STRESS-SENSITIVE FILM

(75) Inventors: Thomas G. Thundat, Knoxville; Eric A. Wachter, Oak Ridge; J. Kenneth Davis, Kingston, all of TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/404,954

(22) Filed: Sep. 24, 1999

(51) Int. Cl.[7] .................................................. G01P 15/00
(52) U.S. Cl. ........................... 73/514.36; 73/514.34; 73/514.26; 310/309; 361/280
(58) Field of Search .................. 73/514.36, 514.34, 73/514.26, 514.17, 514.18; 310/309; 361/280, 283.1, 287

(56) References Cited

U.S. PATENT DOCUMENTS 5,211,051 * 5/1993 Kaiser et al. ........................... 73/1 D
5,267,471 * 12/1993 Abraham et al. ....................... 73/105
5,719,324   2/1998 Thundat .
5,918,263   6/1999 Thundat .

OTHER PUBLICATIONS

G. Y. Chen, et al "Adsorption–Induced Surface Stress & Its Effects on Resonance Frequency of Microcaltilevers" J.Appl.Phys. 77 (8), Apr. 1995, 1–5.
M. Ilavsky et al, Responsive Gels: Volume Transitions I Editor: K. Dusek, 1993.

* cited by examiner

Primary Examiner—Richard A. Moller
(74) Attorney, Agent, or Firm—Joseph A. Marasco

(57) ABSTRACT

Methods and apparatus for detecting particular frequencies of acoustic vibration utilize an electrostatically-tunable beam element having a stress-sensitive coating and means for providing electrostatic force to controllably deflect the beam element thereby changing its stiffness and its resonance frequency. It is then determined from the response of the electrostatically-tunable beam element to the acoustical vibration to which the beam is exposed whether or not a particular frequency or frequencies of acoustic vibration are detected.

27 Claims, 7 Drawing Sheets

ELECTROSTATICALLY TUNABLE RESONANCE FREQUENCY BEAM UTILIZING A STRESS-SENSITIVE FILM

CROSS-REFERENCE TO RELATED APPLICATIONS

The invention herein described and claimed relates to U.S. patent application Ser. No. 09/405,461, entitled Magnetically Tunable Resonance Frequency Beam Utilizing A Stress-Sensitive Film by J. K. Davis et al., filed on even date herewith, the entire disclosure of which is incorporated herein by reference.

The invention herein described and claimed relates to U.S. patent aplication Ser. No. 09/405, 924 , entitled Piezoelectrically Tunable Resonance Frequency Beam Utilizing A Stress-Sensitive Film by T. G. Thundat et al., filed on even date herewith, the entire disclosure of which is incorporated herein by reference.

The United States Government has rights in this invention pursuant to contract no. DE-AC05-96OR22464 between the United States Department of Energy and Lockheed Martin Energy Research Corporation.

FIELD OF THE INVENTION

The present invention relates to methods and apparatus for detecting particular frequencies of vibration, and especially for detecting and selecting particular frequencies of vibration using detection and selection apparatus comprising electrostatically-tunable beam members such as cantilevers and very small cantilevers, often called microcantilevers.

BACKGROUND OF THE INVENTION

The resonance frequencies of a beam occur at discrete values based on the geometrical and mechanical properties of the beam and the environment in which it is located. The efficiency of resonance is measured by the quality factor (or Q-factor), where large Q-factors correspond to high efficiency. High-Q beams such as cantilever beams can be used as efficient listening devices for particular frequencies, with much higher sensitivity and specificity for particular acoustic bands of interest in comparison to conventional acoustic transducers. Moreover, microcantilevers, which are only a few hundred microns in length, are also much more simple to produce and could be far smaller in comparison to standard microphone technologies. As an inevitable consequence of their high specificity, one would need an exorbitant number of fixed-frequency cantilevers to cover a broad frequency spectrum. Because of this simple reason cantilever-based listening devices have not attracted significant attention. Thus, it is desirable to make a high-Q cantilever that uses an electrostatic method to achieve broad frequency tunability. The resonance frequency of such a cantilever might be changed by varying an electrical charge, potential or voltage (hereinafter referred to as potential) and thereby varying electrostatic attraction or repulsion (hereinafter referred to as electrostatic force) acting upon the cantilever.

OBJECTS OF THE INVENTION

Accordingly, it is an object of the present invention to provide a new and improved method and apparatus for tuning the resonance frequency of a beam such as a cantilever element, and more specifically to provide a new method and apparatus for tuning the resonance frequency of a beam such as a cantilever element by varying a voltage applied to the beam.

Further and other objects of the present invention will become apparent from the description contained herein.

SUMMARY OF THE INVENTION

In accordance with one aspect of the present invention, the foregoing and other objects are achieved by an electrostatically-tunable beam for detecting a particular frequency of acoustic vibration and for selecting a particular frequency of acoustic vibration out of a mixture of frequencies which comprises: a beam element having an end and a surface, and being fixedly disposed on the end; a stress-sensitive means for sensing stress selected from the group consisting of: a stress sensitive coating having a stiffness that varies with the stress therein affixed on the surface of the beam element and the beam element material having a stiffniess that varies with the stress therein; a first electrical conductor means for conducting electricity selected from the group consisting of: an electrically conductive coating disposed on a surface of the beam element and the electrical conductivity of the beam element material; a second electrical conductor means for conducting electricity fixedly disposed generally parallel to the first electrical conductor means and separated from the first electrical conductor means by a gap formed therebetween; electrical potential means suitably disposed and connected for providing electrical potentials upon the first electrical conductor means and the second electrical conductor means to cause electrostatic force between the first electrical conductor means and the second electrical conductor means whereby electrostatic force therebetween causes the beam element to bend, thereby producing a change in stress in the stress-sensitive means and a change in the resonance frequency of the electrostatically-tunable beam.

In accordance with a second aspect of the present invention, the foregoing and other objects are achieved by a method for detecting a particular frequency of acoustical vibration in a mixture of frequencies which comprises the steps of: providing an electrostatically-tunable beam comprising a beam element having an end and a surface and being fixedly disposed on the end; a stress-sensitive means for sensing stress selected from the group consisting of: a stress sensitive coating having a stiffness that varies with the stress therein affixed on the surface of the beam element and the beam element material having a stiffness that varies with the stress therein; a first electrical conductor means for conducting electricity selected from the group consisting of: an electrically conductive coating disposed on a surface of the beam element and the electrical conductivity of the beam element material; a second electrical conductor means for conducting electricity fixedly disposed generally parallel to the first electrical conductor means and separated from the first electrical conductor means by a gap formed therebetween; and electrical potential means suitably disposed and connected for providing electrical potentials upon the first electrical conductor means and the second electrical conductor means; exposing the beam element to the mixture of frequencies; activating the electrical potential means to cause electrostatic force between the first electrical conductor means and the second electrical conductor means whereby electrostatic force therebetween causes the beam element to bend thereby producing a change in stress in the stress-sensitive means and a change in the resonance frequency of the electrostatically-tunable beam to permit the electrostatically-tunable beam to respond resonantly at the particular frequency; and determining from the resonance response of the electrostatically-tunable beam whether the particular frequency of vibration is detected.

In accordance with a third aspect of the present invention, the foregoing and other objects are achieved by a method for selecting a desired frequency of acoustical vibration from a mixture of frequencies which comprises the steps of: providing an electrostatically-tunable beam comprising a beam element having an end and a surface, and being fixedly disposed on the end; a stress-sensitive means for sensing stress selected from the group consisting of: a stress sensitive coating having a stiffness that varies with the stress therein affixed on the surface of the beam element and the beam element material having a stiffniess that varies with the stress therein; a first electrical conductor means for conducting electricity selected from the group consisting of: an electrically conductive coating disposed on a surface of the beam element and the electrical conductivity of the beam element material; a second electrical conductor means for conducting electricity fixedly disposed generally parallel to the first electrical conductor means and separated from the first electrical conductor means by a gap formed therebetween; and electrical potential means suitably disposed and connected for providing electrical potentials upon the first electrical conductor means and the second electrical conductor means; activating the electrical potential means to cause electrostatic force between the first electrical conductor means and the second electrical conductor means whereby electrostatic force therebetween causes the beam element to bend thereby producing a change in stress in the stress-sensitive means and a change in the resonance frequency of the electrostatically-tunable beam to establish the resonance frequency of the electrostatically-tunable beam at the desired frequency; and exposing the electrostatically-tunable beam to the mixture of frequencies to excite the electrostatically-tunable beam to vibrate at a desired resonance frequency whereby the particular frequency desired is selected out of the mixture of frequencies.

BRIEF DESCRIPTION OF THE DRAWINGS

In the drawings.

Like elements in the figures are indicated by like numerals.

Figure 1A:
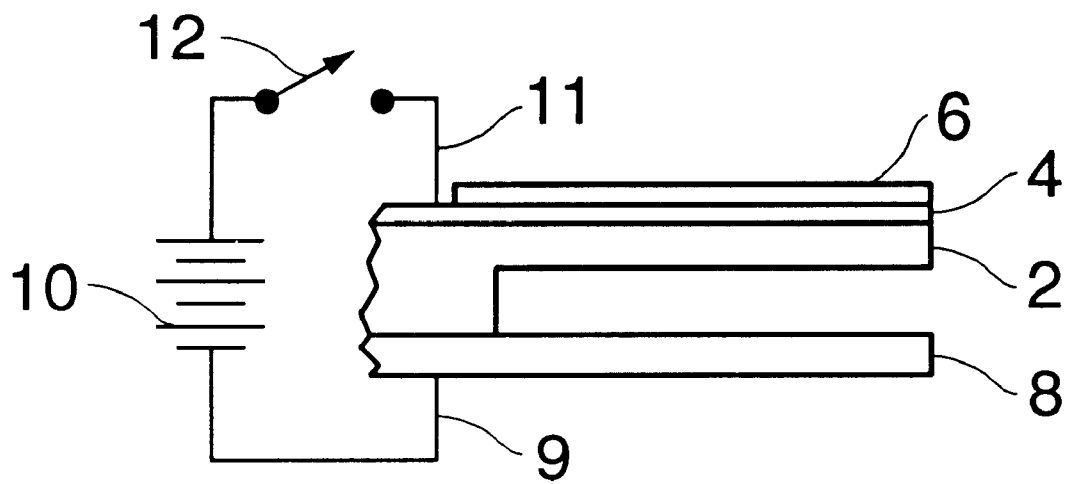
FIGS. 1a, 1b, 1c, and 1d show a preferred method for varying cantilever resonance frequency wherein an electrically conductive coating is applied to the cantilever.

For a better understanding of the present invention, together with other and further objects, advantages and capabilities thereof, reference is made to the following disclosure and appended claims in connection with the above-described drawings.

DETAILED DESCRIPTION OF THE INVENTION

The claimed invention is based on the concept of changing the resonance frequency of a cantilever by changing its stiffness. The resonance frequency, $\nu$, of an oscillating cantilever can be expressed as $$\nu = \frac{1}{2\pi}\sqrt{\frac{K}{m^*}} \quad (1)$$

where K is the stiffness and m* is the effective mass of the cantilever. Note that $m^* = nm_b$, where $m_b$ is the mass of the cantilever beam and the value of n is about 0.24 for a rectangular cantilever.

There are several approaches by which the resonance frequency of a cantilever can be varied. The approach described herein involves the application of a stress sensitive film to the cantilever surface. Young's Modulus for many polymers varies with applied stress due to changes in bond length of the constituent molecules.

If the cantilever is coated with or comprises a stress-sensitive material, the stiffness can be changed by bending the cantilever. The stress-sensitive material may preferably be selected from but not limited to the group consisting of metals, metal alloys, dielectric materials, polymeric materials and combinations thereof. Specific examples of such polymeric materials include but are not limited to such polymers as polycarbonate of visphenol, poly [N,N'-(p,p'-oxydiphenylene) pyromellitimide], poly (viny chloride), and the like. Many other polymers are known to the skilled artisan which perform as described herein. This bending can be easily effected by electrostatic means. When the length of the cantilever is much larger than the width, Hooke's Law for small deflections relating the curvature with effective modulus, Y, and moment, M, is given by $$\frac{d^2z}{dy^2} = \frac{M}{YI} \quad (2)$$

where $d^2z/dy^2$ represents I, y represents distance, and z represents deflection.

The effective modulus Y in isotropic elasticity is $E/(1-\upsilon)$ where E is Young's Modulus and $\upsilon$ is Poisson's ratio for the substrate. For rectangular cantilevers, the area moment of inertia I is given by $Wt^3/12$, where W is the width and t is the thickness. The moment due to stress $\delta s$ is given as $\delta s$ Wt/2 . Using the moment equation 2 can be written in the form of Stoney's formula as $$\frac{1}{R} = \frac{6(1-\upsilon)\delta s}{Et^2} \quad (3)$$

where the reciprocal of the radius of curvature, R, equals $d^2z/dy^2$ . The displacement and surface stress are related by Equation 2. Taking into account the boundary conditions of a cantilever, Equation 2 can be solved and the displacement of the cantilever, z, can be written as $$z = \left[\frac{3(1-\upsilon)L^2}{t^2E}\right]\delta s \quad (4)$$

where L is the length of the cantilever. Bending can be accomplished by electrostatic deflection of the cantilever. Differential surface stress, $\delta s$, induced in the cantilever or in a stress-sensitive coating located on the surface of the cantilever changes the effective rigidity of the cantilever, resulting in a shift in stiffness from K to $(K+\delta K)$. Therefore Equation 1 can be rewritten as $$v_2 = \frac{1}{2\pi}\sqrt{\frac{K+\delta K}{m^*}} \quad (5)$$

where the initial resonance frequency $v_1$, changes to $v_2$ due to surface stress. By using stress-sensitive materials in or on the cantilever, large values of $\delta K$ can be obtained for small changes in surface stress.

Figure 1B:
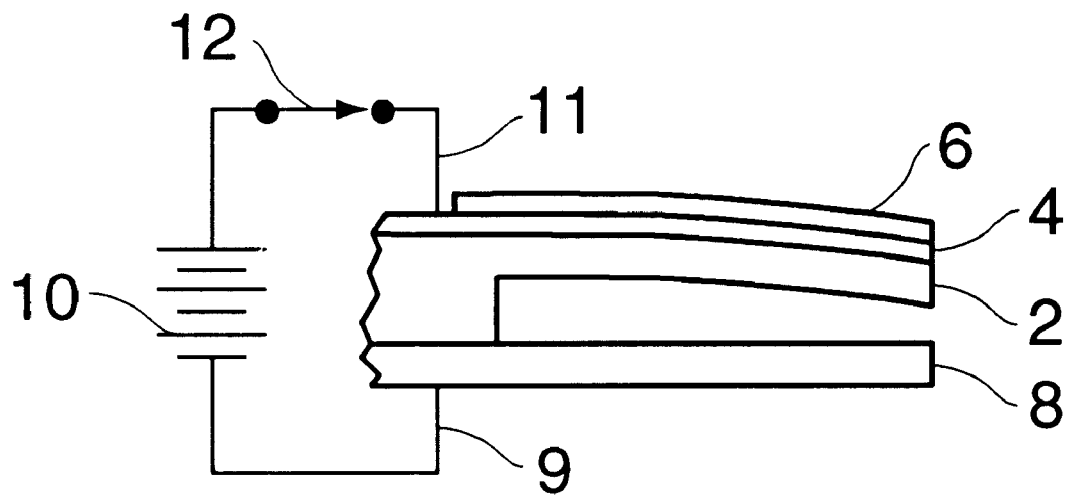

A preferred method for varying cantilever resonance frequency is shown in FIGS. 1a and 1b, which represent side views of an electrostatically-tunable cantilever. In FIG. 1a, a cantilever 2 has a conductive coating 4 and a stress-sensitive coating 6 applied to one surface. The conductive coating on the cantilever is separated from a second conductor 8 by a gap formed between the second conductor 8 and the cantilever 2. The cantilever 2 may consist of any of a number of dielectric materials, such as silicon nitride or silicon dioxide, while the conductive layers 4, 8 may preferably be comprised of metals such as gold or platinum or some other conductive material. An electrical potential is applied across the gap formed between the conductors 4, 8 by appropriate connections 9, 11 to a potential source 10. This potential source 10 may be a static potential that is controlled by a switch 12, or it may be a time-varying pattern such as a sinusoid or a triangular waveform. When the switch 12 is closed and a potential is applied, electrostatic force between the two conductors causes the cantilever to bend, producing a change in stress in coating 6 that results in a change in stiffness and concomitant change in resonance frequency. The magnitude of the change in resonance frequency is controlled by the extent of the bending, which is in turn controlled by the magnitude of the applied electrical potential.

In FIGS. 1a and 1b, opposite-polarity electrical potentials are shown to be applied between conductors 4, 8 to cause an electrostatic attraction therebetween. In the case of opposite-polarity potentials, conductors 4, 8 must be electrically insulated from each other.

Figure 1C:
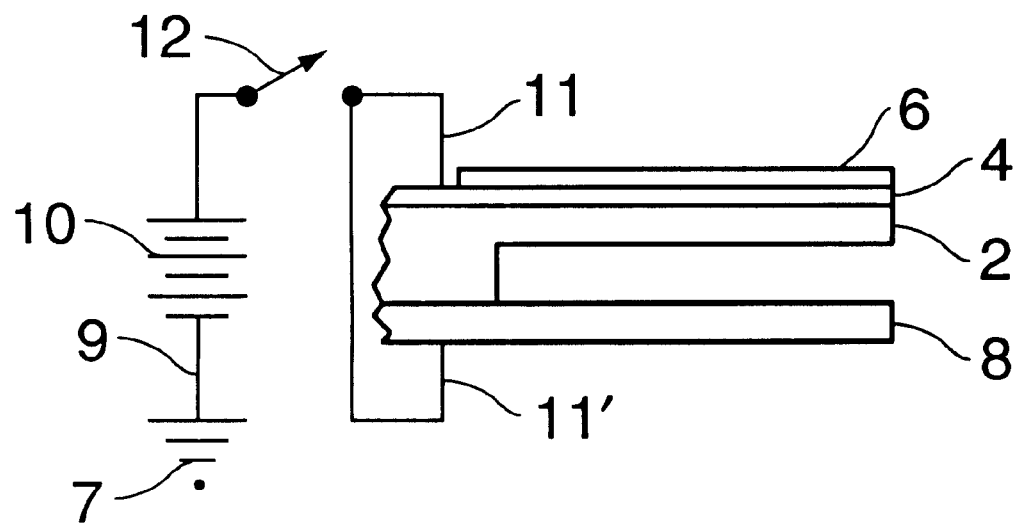
Figure 1D:
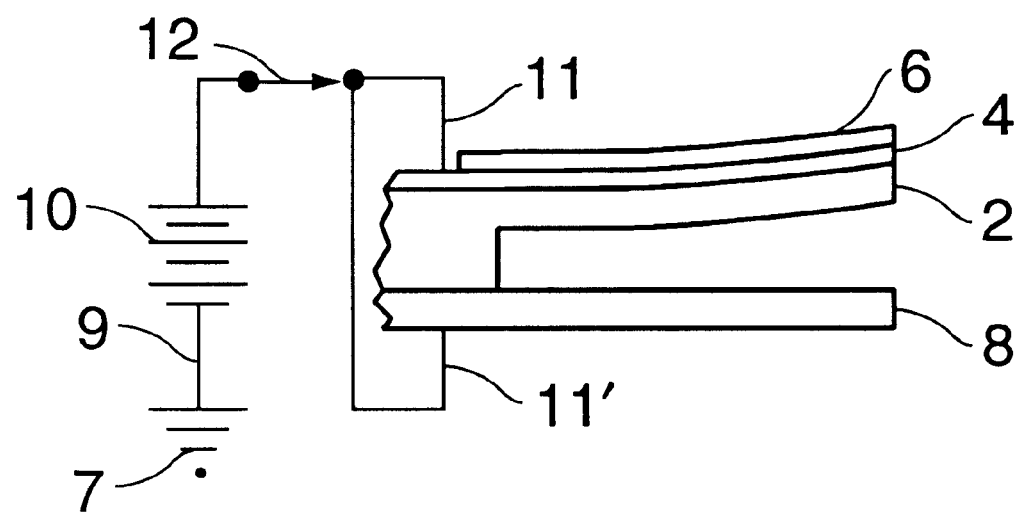

In FIGS. 1c and 1d, electrical potentials of like polarity are shown to be applied via connections 11, 11' to conductors 4, 8 to cause an electrostatic repulsion therebetween. In such an embodiment electrical insulation between 4, 8 may not be necessary. The potential source is generally grounded by appropriate connection 9 to a ground 7.

Figure 2A:
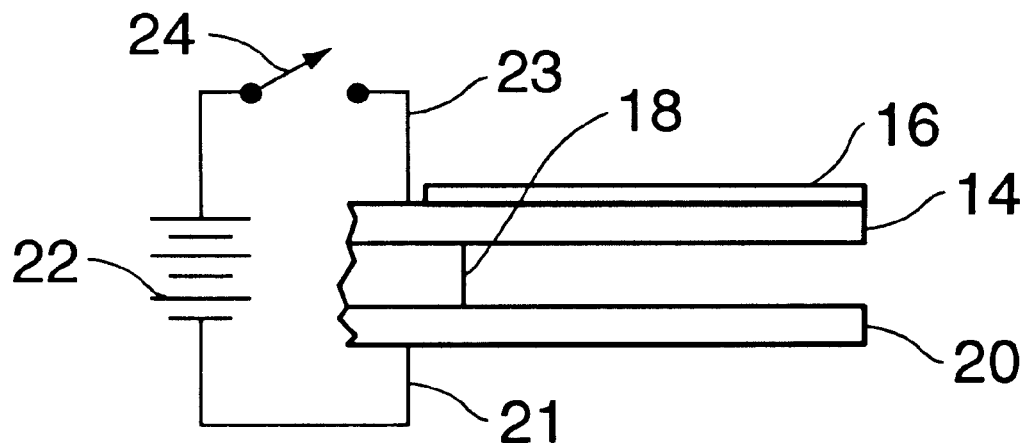
FIGS. 2a, 2b, 2c, 2d, and 2e show an alternate design for a cantilever assembly wherein the cantilever itself comprises an electrically conductive material in accordance with the present invention.
Figure 2B:
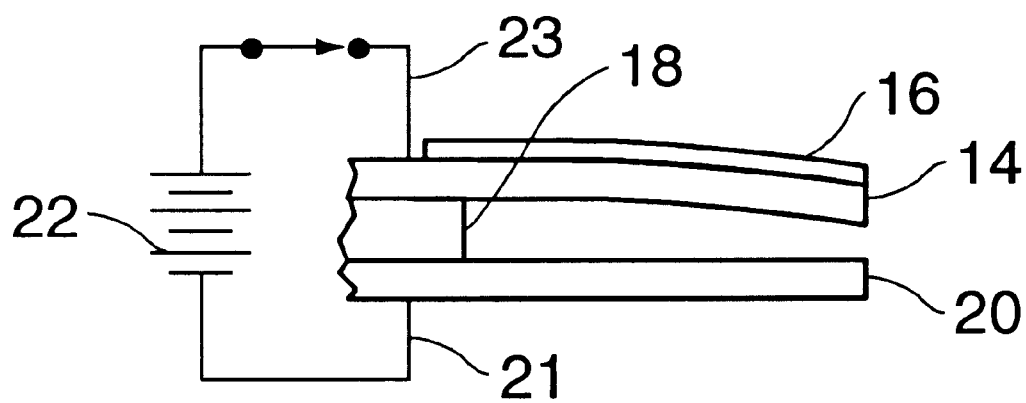

Another embodiment for the cantilever assembly is shown in FIGS. 2a–2b. Here, the cantilever itself 14 is comprised of a conductive material, with a stress-sensitive coating 16 applied to one side. An insulating spacer 18 separates the conductive cantilever 14 from a second conductor 20. A potential source 22 is applied to the two conductors 14, 20 as described above via connectors 21, 23 to cause an electrostatic attraction therebetween. A switch 24 may be used to control the application of the electrical potential, or a time-varying source may be used, as in the previous embodiment.

Figure 2C:
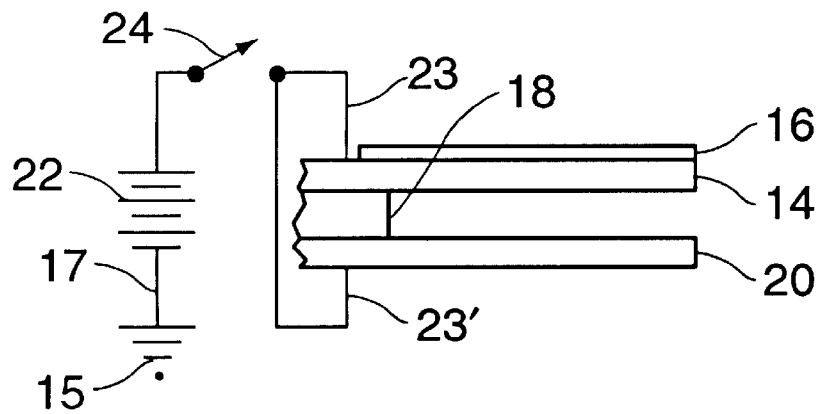
Figure 2D:
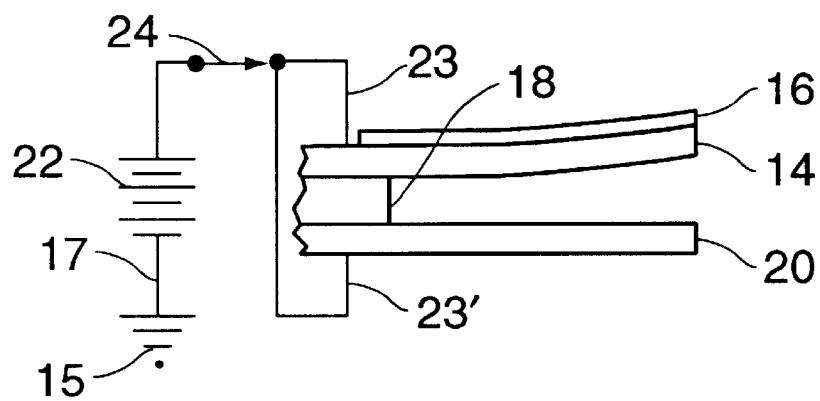
Figure 2E:
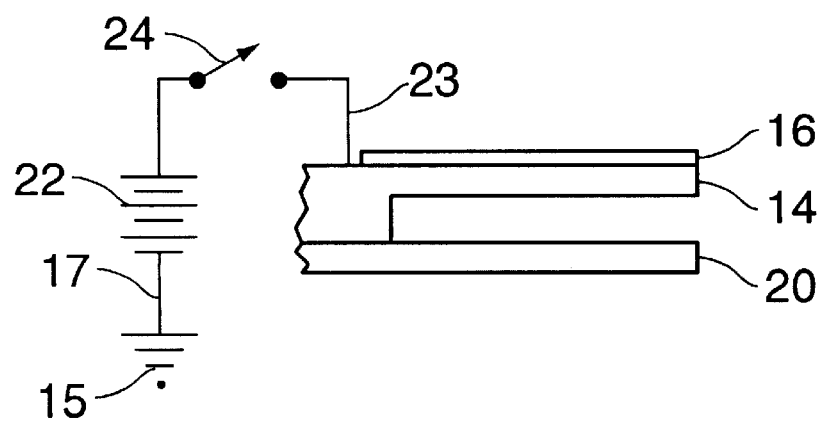

In FIGS. 2c–2e, electrical potentials of like polarity are shown to be applied via connections 23, 23'to conductors 14, 20 to cause an electrostatic repulsion therebetween. In such an embodiment electrical insulation (spacer 18 ) between 14, 20 may not be necessary, and connector 23'would also not be necessary, as shown in FIG. 2e. The potential source is generally grounded by appropriate connection 17 to a ground 15.

Figure 3A:
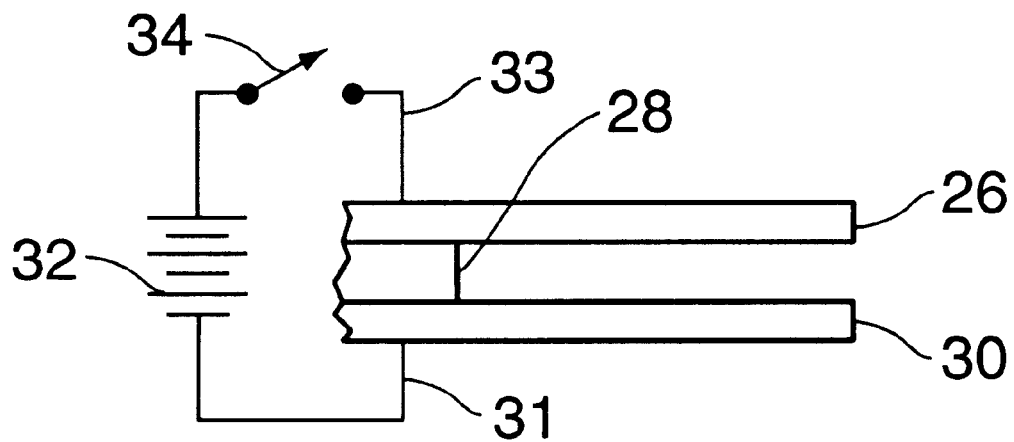
FIGS. 3a, 3b, 3c, 3d, and 3e show a cantilever beam comprising a material that exhibits an intrinsic change in stiffness upon bending in accordance with the present invention.
Figure 3B:
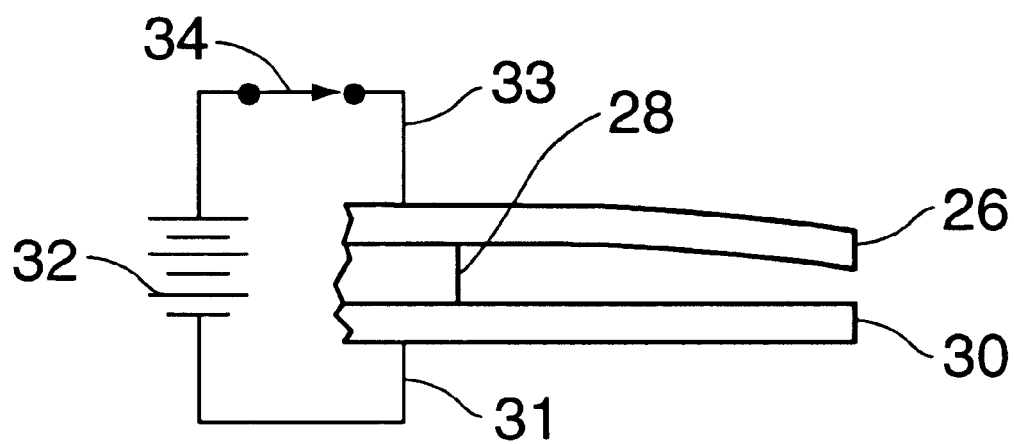

Yet another embodiment shown in FIGS. 3a and 3b uses a cantilever beam comprising a material that exhibits an intrinsic change in stiffness upon bending. A conductive cantilever 26 is separated by an insulating spacer 28 from a second conductor 30. Imposition of a potential source to the conductors 26, 30 via connections 31, 33 as described above causes the cantilever to bend, resulting in a change in stress, stiffness, and hence resonance frequency. A switch 34 or time-varying potential source may be used to control the resonance frequency of the cantilever as a function of time.

Figure 3C:
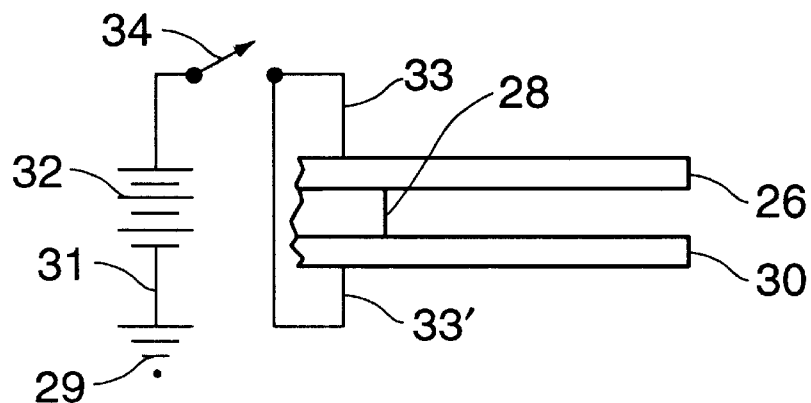
Figure 3D:
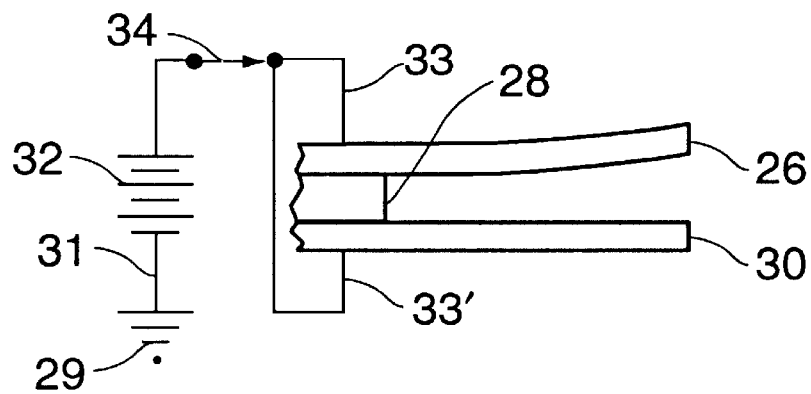
Figure 3E:
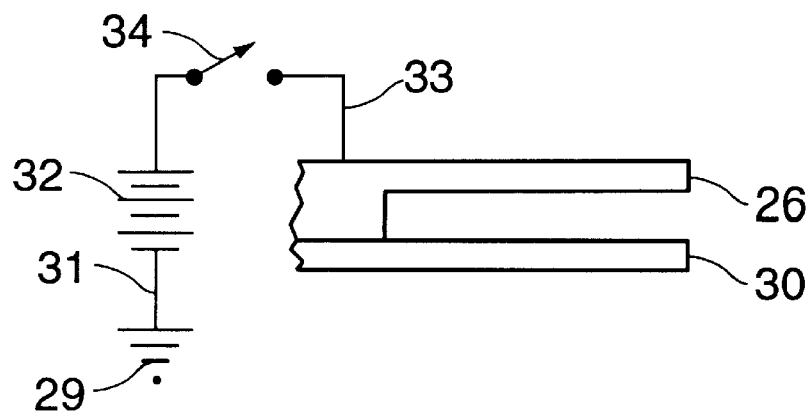

In FIGS. 3c–3e, electrical potentials of like polarity are shown to be applied via connections 33, 33'to conductors 26, 30 to cause an electrostatic repulsion therebetween. In such an embodiment electrical insulation (spacer 28 ) between 26, 30 may not be necessary, and connector 33'would also not be necessary, as shown in FIG. 2e. The potential source is generally grounded by appropriate connection 31 to a ground 29.

Figure 4:
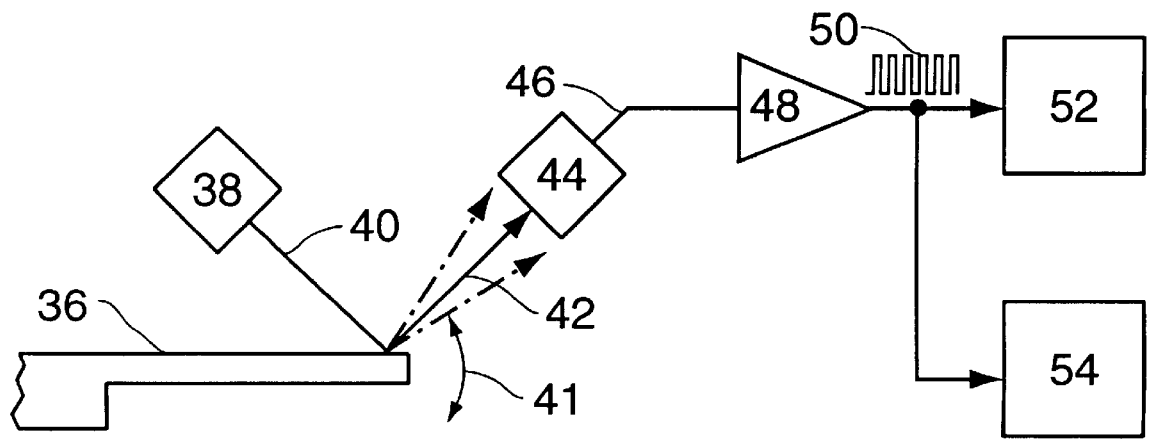
FIG. 4 shows an example of an optical detection method in accordance with the present invention.

The tuning range available to an individual cantilever as shown in the FIGS. will depend on the initial stiffness of the cantilever beam, the extent of bending exerted on the beam, and the change in stress for the stress sensitive material. To effect high sensitivity detection of acoustic energy, the cantilever is electronically tuned to the appropriate resonance frequency, where it will respond by vibrating in resonance with the acoustic signal. This vibration can be detected by any of several common means, including optical detection of cantilever deflection, changes in piezoelectricity of coatings applied to the cantilever, capacitance variation between the cantilever and a fixed surface, piezoresistance of cantilever beam, or changes in tunneling current or capacitance between the cantilever and a stationary electrode. These methods are all well-known to the artisan skilled in atomic force microscopy for sensitive detection of cantilever deflection. An example of the optical deflection means is shown in FIG. 4. Here, vibration of a cantilever 36 is monitored using a diode laser 38. Light 40 emitted from the laser 38 is reflected from the end of the cantilever 36. The reflected light 42 sweeps across a position sensitive photodiode 44 at the frequency of cantilever vibration, indicated by arrow 41. Output 46 from the photodiode 44 is amplified by an amplifier 48 and the amplified signal 50 is fed into a counting circuit 52. The number of cycles per unit time observed by the counter is used to determine the frequency of vibration. The amplitude of the output signal 50 is monitored by an analog differentiation circut 54 to determine the magnitude of the cantilever oscillation.

Figure 5:
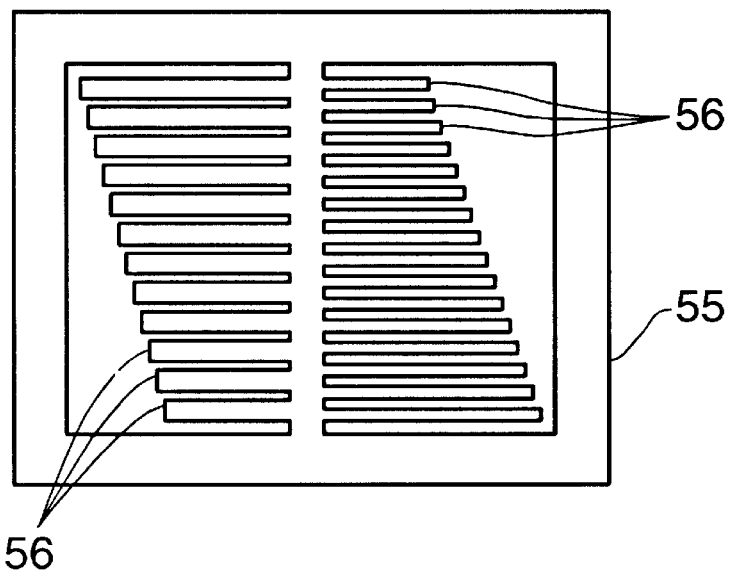
FIG. 5 shows an array of multiple cantilevers having different geometries which can be used as an ensemble to cover an acoustic spectrum in accordance with the present invention.

To detect a broad range of frequencies, it may be desirable to use an array of cantilevers, each element of which is individually tuned for optimal response over a portion of the total acoustic range. A possible configuration is shown in FIG. 5, where an array 55 of cantilevers 56 having different geometries are used as an ensemble to cover an acoustic spectrum. Each element may be tuned during manufacture to assure the preferred response within its functional range. A possible packaging configuration for an array of cantilevers might include all readout electronics on a single monolithic device. Such a device could be manufactured using standard integrated circuit production methods, and would require the use of no additional discrete components. As such, it could be considerably smaller, less expensive, and more rugged than other available acoustic monitoring technologies.

The claimed invention provides a number of advantages and features:

Tunability —The method provides a means for achieving high sensitivity and high selectivity through the use of tunable, high-Q resonance frequency.

Simplicity —Resonance frequency is inherently simple to measure, and the small devices can be manufactured in arrays having desired acoustic response characteristics.

Speed —Much faster response time (tens of μs) than conventional acoustic detectors (tens of ms) due to extremely small size and large Q value.

Sensitivity —The sensitivity can be controlled by the geometry of the cantilevers and the coating on the cantilevers. This can be made very broadband, narrow band, low pass, or high pass.

Size —Current state-of-the-art in micro-manufacturing technologies suggest that a sensor array and control electronics could be housed in a standard transistor package.

Low power consumption —The power requirement are estimated to be in sub-mW range for individual sensors allowing the use of battery or photovoltaic power.

Low cost —No exotic or expensive materials or components are needed for sensor fabrication. Electronics for operation and control are of conventional design, and are relatively simple and inexpensive.

Wide range —A wide range of the acoustic spectrum could be detected using an array of cantilevers with different initial K values.

A number of alternative embodiments are possible. The stiffness of the cantilevers may also be changed by using materials that change rigidity under the action of an imposed electric field or potential. The device herein before described is made of cantilever-type beams with one end free to vibrate. However, a similar device may be constructed using beams of other configurations, such as simply supported beams wherein both ends are supported, free to rotate; or beams with both ends fixed, not free to rotate; with one end fixed and one end supported and free to rotate; and other simple and compound beam structures and combinations, such as triangular beams having two corners fixed and the third corner free.

Alternative uses are also possible. For example, in addition to being used to detect particular frequencies of acoustic vibration, the apparatus may be used as a narrow band filter to select a particular frequency out of a mixture of acoustic frequencies.

Applications for the claimed invention are numerous and varied, and may include: passive listening devices for detection of concealed objects, including submarines and buried structures, location of fish schools, or detection of leaking pipelines; passive flow monitoring based on acoustic signatures of the Venturi Effect and other phenomenon; replacing microphones used to detect pending mechanical failure of machine components (for example, the gear box of helicopters, machine tools, power plant turbines, or automobile engines); detection of thermal or mechanical stress in objects or structures based on passive acoustic signatures; burglar and intrusion detectors and alarms for buildings and vehicles; simplified voice recognition systems; and cochlear implants for hearing impaired people.

While there has been shown and described what are considered the preferred embodiments of the invention, it will be obvious to those skilled in the art that various changes and modifications can be made therein without departing from the scope of the inventions defined by the appended claims.

We claim:

1. An electrostatically-tunable beam for detecting a particular frequency of acoustic vibration out of a mixture of frequencies comprising:

a beam element having an end and a surface, and being fixedly disposed on the end;

a stress-sensitive means for sensing stress selected from the group consisting of: a stress sensitive coating having a stiffness that varies with the stress therein affixed on the surface of the beam element and the beam element material having a stiffness that varies with the stress therein;

a first electrical conductor means for conducting electricity selected from the group consisting of: an electrically conductive coating disposed on a surface of the beam element and the electrical conductivity of the beam element material;

a second electrical conductor means for conducting electricity fixedly disposed generally parallel to the first electrical conductor means and separated from the first electrical conductor means by a gap formed therebetween;

electrical potential means suitably disposed and connected for providing electrical potentials upon the first electrical conductor means and the second electrical conductor means to cause electrostatic force between the first electrical conductor means and the second electrical conductor means whereby electrostatic force therebetween causes the beam element to bend, thereby producing a change in stress in the stress-sensitive means and a change in the resonance frequency of the electrostatically-tunable beam.

2. The electrostatically-tunable beam as described in claim 1 wherein the beam element comprises a cantilever beam.

3. The electrostatically-tunable beam as described in claim 1 wherein the stress-sensitive coating is selected from the group consisting of metals, metal alloys, dielectric materials, polymeric materials and combinations thereof.

4. The electrostatically-tunable beam as described in claim 1 wherein the stress-sensitive cantilever beam material is selected from the group consisting of metals, metal alloys, dielectric materials, polymeric materials and combinations thereof.

5. The electrostatically-tunable beam as described in claim 1 wherein the conductive coating is selected from the group consisting of conductive metals and conductive alloys of metals.

6. The electrostatically-tunable beam as described in claim 1 further comprising detection means for detecting vibration of the beam element.

7. The electrostatically-tunable beam as described in claim 6 wherein the detection means is selected from the group consisting of optical detection means, means utilizing changes in piezoresistance of the stress sensitive means and means utilizing changes in tunneling current between the electrostatically-tunable beam and a stationary electrode.

8. The electrostatically-tunable beam as described in claim 1 wherein the electrical potential means is disposed and connected to provide electrical potentials of opposite polarity upon the first electrical conductor means and the second electrical conductor means to cause electrostatic attraction therebetween.

9. The electrostatically-tunable beam as described in claim 1 wherein the electrical potential means is disposed and connected to provide electrical potentials of like polarity upon the first electrical conductor means and the second electrical conductor means to cause electrostatic repulsion therebetween.

10. A method for detecting a particular frequency of acoustical vibration in a mixture of frequencies comprising the steps of:

a. providing an electrostatically-tunable beam comprising a beam element having an end and a surface and being fixedly disposed on the end; a stress-sensitive means for sensing stress selected from the group consisting of:

a stress sensitive coating having a stiffness that varies with the stress therein affixed on the surface of the beam element and the beam element material having a stiffness that varies with the stress therein; a first electrical conductor means for conducting electricity selected from the group consisting of: an electrically conductive coating disposed on a surface of the beam element and the electrical conductivity of the beam element material; a second electrical conductor means for conducting electricity fixedly disposed generally parallel to the first electrical conductor means and separated from the first electrical conductor means by a gap formed therebetween; and electrical potential means suitably disposed and connected for providing electrical potentials upon the first electrical conductor means and the second electrical conductor means;

b. exposing the beam element to the mixture of frequencies;

c. activating the electrical potential means to cause electrostatic force between the first electrical conductor means and the second electrical conductor means whereby electrostatic force therebetween causes the beam element to bend thereby producing a change in stress in the stress-sensitive means and a change in the resonance frequency of the electrostatically-tunable beam to permit the electrostatically-tunable beam to respond resonantly at the particular frequency; and d. determining from the resonance response of the electrostatically-tunable beam whether the particular frequency of vibration is detected.

11. The method as described in claim 10 wherein the beam element comprises a cantilever beam.

12. The method as described in claim 10 wherein the stress-sensitive coating is selected from the group consisting of metals, metal alloys, dielectric materials, polymeric materials and combinations thereof.

13. The method as described in claim 10 wherein the stress-sensitive cantilever beam material is selected from the group consisting of metals, metal alloys, dielectric materials, polymeric materials and combinations thereof.

14. The method as described in claim 10 wherein the conductive coating is selected from the group consisting of conductive metals and conductive alloys of metals.

15. The method as described in claim 10 further comprising the step of utilizing means for detecting vibration of the beam element.

16. The method as described in claim 15 wherein the detection means is selected from the group consisting of optical detection means, means utilizing changes in piezoresistance of the cantilever beam and means utilizing changes in tunneling current between the electrostatically-tunable beam and a stationary electrode.

17. The method as described in claim 10 wherein the electrical potential means is disposed and connected to provide electrical potentials of opposite polarity upon the first electrical conductor means and the second electrical conductor means to cause electrostatic attraction therebetween.

18. The method as described in claim 10 wherein the electrical potential means is disposed and connected to provide electrical potentials of like polarity upon the first electrical conductor means and the second electrical conductor means to cause electrostatic repulsion therebetween.

19. A method for selecting a desired frequency of acoustical vibration from a mixture of frequencies comprising the steps of:

a. providing an electrostatically-tunable beam comprising a beam element having an end and a surface, and being fixedly disposed on the end; a stress-sensitive means for sensing stress selected from the group consisting of: a stress sensitive coating having a stiffness that varies with the stress therein affixed on the surface of the beam element and the beam element material having a stiffness that varies with the stress therein; a first electrical conductor means for conducting electricity selected from the group consisting of: an electrically conductive coating disposed on a surface of the beam element and the electrical conductivity of the beam element material; a second electrical conductor means for conducting electricity fixedly disposed generally parallel to the first electrical conductor means and separated from the first electrical conductor means by a gap formed therebetween; and electrical potential means suitably disposed and connected for providing electrical potentials upon the first electrical conductor means and the second electrical conductor means;

b. activating the electrical potential means to cause electrostatic force between the first electrical conductor means and the second electrical conductor means whereby electrostatic force therebetween causes the beam element to bend thereby producing a change in stress in the stress-sensitive means and a change in the resonance frequency of the electrostatically-tunable beam to establish the resonance frequency of the electrostatically-tunable beam at the desired frequency; and c. exposing the electrostatically-tunable beam to the mixture of frequencies to excite the electrostatically-tunable beam to vibrate at a desired resonance frequency whereby the particular frequency desired is selected out of the mixture of frequencies.

20. The method as described in claim 19 wherein the beam element comprises a cantilever beam.

21. The method as described in claim 19 wherein the stress-sensitive coating selected from the group consisting of metals, metal alloys, dielectric materials, polymeric materials and combinations thereof.

22. The method as described in claim 19 wherein the stress-sensitive cantilever beam material is selected from the group consisting of metals, metal alloys, dielectric materials, polymeric materials and combinations thereof.

23. The method as described in claim 19 wherein the conductive coating is selected from the group consisting of conductive metals and conductive alloys of metals.

24. The method as described in claim 19 further comprising the step of utilizing means for detecting vibration of the beam element.

25. The method as described in claim 24 wherein the detection means is selected from the group consisting of optical detection means, means utilizing changes in piezoresistance of the cantilever beam and means utilizing changes in tunneling current between the electrostatically-tunable beam and a stationary electrode.

26. The method as described in claim 19 wherein the electrical potential means is disposed and connected to provide electrical potentials of opposite polarity upon the first electrical conductor means and the second electrical conductor means to cause electrostatic attraction therebetween.

27. The method as described in claim 19 wherein the electrical potential means is disposed and connected to provide electrical potentials of like polarity upon the first electrical conductor means and the second electrical conductor means to cause electrostatic repulsion therebetween.

* * * * *